INVENTORS
FRANK H. FELLOWS
AND HARVARD H. GORRIE
BY
Raymond W. Jenkins
ATTORNEY

Patented Dec. 15, 1953

2,662,509

UNITED STATES PATENT OFFICE 2,662,509

CONTROL APPARATUS

Frank H. Fellows, Cleveland, and Harvard H. Gorrie, Cleveland Heights, Ohio, assignors to Bailey Meter Company, a corporation of Delaware Application February 18, 1950, Serial No. 145,032

10 Claims. (Cl. 122—451)

Safety devices in the control systems of power producing equipment have grown steadily in importance as the equipment of modern power plants continues to represent larger capital expenditures. Warning devices are needed to inform operators of the development of critical conditions at multiple stations in the power producing equipment. In addition to signals, bells and alarms, there is a need for devices to monitor the functioning of normally operative automatic control systems and, upon the failure of motivating power to a control system as a unit, means are needed which either immobilize the units responsive to such systems or which shift a portion, or all, of the function of the primary system to secondary systems maintained in operability for just such eventuality.

Aside from purely economic reasons, marine power installations have the need of secondary control systems which can function in the event of primary control system failure to maintain the operation of vessels at a practical level of their efficiency under hazards of military operations. The largest, unified factor in the effectiveness of a marine vessel is its power-producing ability, and the most important system in the function of its power-producer is that of the controls of the combustion process whose heat is maintained in transfer relationship to the vapor generator, or boiler, and the control of the supply of vaporizable liquid to such section.

If the individual units of the automatic system are powered by air pressure, a failure of such supply produces the aforementioned critical need which must be met by manual supervision of, or some secondary means of automatically positioning, the vital units which cannot with safety be immobilized for any substantial length of time. If practically all units, such as draft dampers, fuel feeders and the like, are immobilized at any particular point of a normal period of operation the power produced will operate in some regard although its efficiency will fluctuate as power demand changes, with no fundamental damage likely to occur to the basic equipment over a comparatively long period of time. However, immobilization of the valve controlling the supply of vaporizable liquid to the generator section will, with relative rapidity, either empty that section of liquid or overflow the generator and flood the vapor-operated apparatus.

Therefore, it is necessary that some degree of response to change in the amount of liquid in the generating section be maintained under even the most extreme conditions for emergency operations. To meet such necessity, our invention has as its object the application of a secondary system of automatic control upon failure of a primary system of automatic control to function.

One object of our invention is to provide means for maintaining feed water supply control in a vapor generator in continuous operation despite the failure of the primary control system of said supply.

More specifically, we wish to provide means for applying the force from a thermo-hydraulic system of feed water control to a feed water valve upon failure of the common air supply to a multi-element feed water control system.

Fig. 3 is a modification of the embodiment of Fig. 1.

Figure 1:
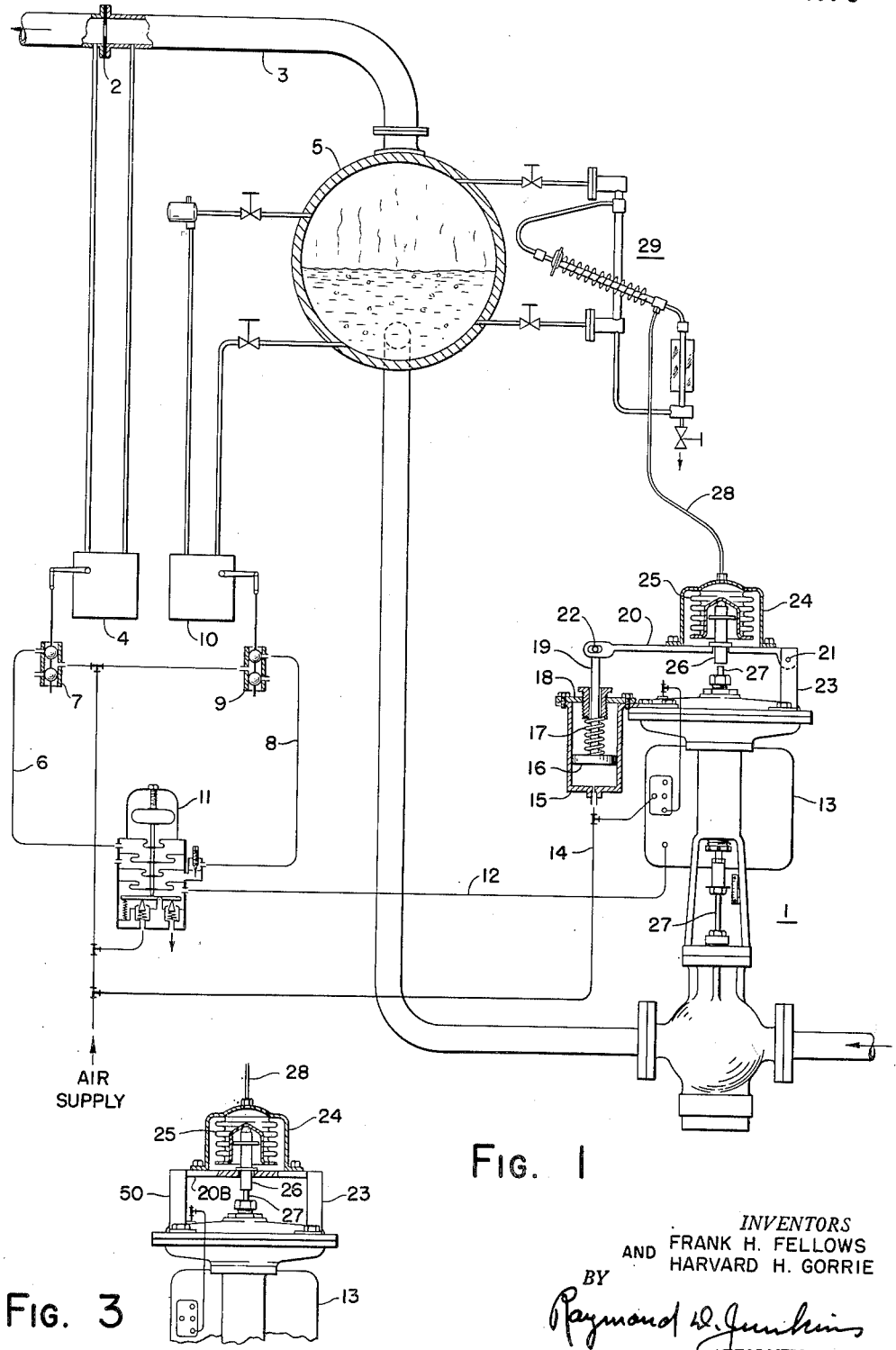
Fig. 1 is a schematic illustration of the normal application of a primary system of feed water control with the present invention positioned in proper relation to the feed water valve for applying the control effect from a secondary system of feed water control to the feed water control valve upon failure of the power supply to the primary system.

In Fig. 1 a two-element system of feed water control is illustrated as representative of a primary system arranged with a vapor generator in the manner necessary to normally apply its control pressure to position a feed water control valve 1. Only the essentials of the conventional system of a vapor generator are shown to provide the setting for this embodiment of our invention. Consequently, feed water control valve 1 is shown simply in position to control the flow of vaporizable liquid entering the vapor generator section 5, to which heat is applied, by means not shown, to produce vapor flowing therefrom through a conduit 3.

A primary element 2, such as an orifice, is inserted in conduit 3 to constrict the vapor flow sufficiently to obtain differential pressures representative of the rate of vapor generated within drum 5 and flowing therefrom through conduit 3. The continuously determined differential is given a linear characteristic by conventional meter device 4 in positioning pilot valve 7 so as to modify the air supply passing through said pilot valve and continuously establish air pressures within line 6, representative of the rate of vapor outflow.

In like manner, level indicator 10 determines the liquid level in drum 5 and, in accordance therewith positions pilot valve 9 in such manner as to continuously modify its air supply into representative pressures within conduit 8. The pressures within conduits 6 and 8 are then conducted to air supplied relay 11 by means of which a third pressure is established in conduit 12 for transmission to valve positioner 13, which may take the form of the subject matter of copending application Serial No. 47,516 of Gorrie et al., for positioning feed water control valve 1.

The power supply needed for operation of pilot valves 7 and 9, the relay 11, and valve positioner 13, originates from a common source of air supply. It is emphasized that a power supply of air is used in the present instance only as an illustration in explanation of the function of the embodiments of our invention, and it is easily conceivable that other mediums of activation may be employed with our invention.

To continue with an explanation of Fig. 1, a representative selection of the common air supply is introduced, by means of conduit 14, into piston housing 15 that its pressure may be conventionally effective upon the face of piston 16, to move it against the force of spring 17 and compress said spring between piston 16 and plate 18. The housing 15 and the piston 16 comprise an expansible chamber with a movable wall. Plate 18 has an opening for piston stem 19 which may have a bushing for maintaining alignment of said piston therethrough from attachment with piston 16 within the housing 15. Plate 18, and/or its bushing, maintain spring 17 in compression with piston 16. Housing 15 is secured firmly to the housing of valve 1 to maintain piston stem 19 therein in a substantially vertical position.

Lever 20 rotates about a pivot 21 in accordance with the vertical movement of piston stem 19 attached to the opposite end thereof. As reciprocation of piston member 16 is desirably maintained with vertical movement of stem member 19, the necessary cooperation by said stem with the rotation of member 20 about pivot 21 is had through a slot 22. Also provision is made on member 20 between pivot 21 and slot 22, for securing thereto a bellows housing 24 into which are conducted pressures from a secondary system of feed water control. Pivot 21 is given a fixed position by reason of rigid bracket member 23 being secured firmly to the diaphragm housing of valve 1.

The bellows housing 24 contains an expansible chamber in the form of a bellows 25 in order to subject said bellows to the control pressures from a secondary system for feed water control, represented by thermo-hydraulic control system 29. In arrangement of this control applicator or monitor with bellows 25, a stem member 26 is provided to extend through lever member 20 at the point that rotation of said lever will operatively engage, or disengage, the stem member 26 and stem member 27 of feed water control valve 1.

Stem member 27 is the conventional means by which the ports of fluid control valve 1 are positioned. From its attachment to the closure means for said ports, stem member 27 extends up through a framework supporting whatever means are used to control stem position. The length of stem 27 may be varied, depending upon the application, in the present instance, the length necessary to extend it above the bellows housing for operative engagement with stem member 26.

Bellows stem 26 is arranged with bellows 25 that its vertical position will reflect control pressures transmitted to bellows 25 upon stem 27 during the period of operative engagement. During the period of non-operative engagement, stem 26 is driven through member 20 until a limiting shoulder on said stem engages lever member 20.

During operation of the primary system of feed water control, that is, while the control pressures in conduits 6 and 8 are producing pressures within conduit 12 to control the position of feed water control valve 1 through the action of valve positioner 13, the common source of air supply pressure maintains piston 16 against the force of spring 17, to an elevation such that complete disengagement of stem members 26 and 27 is maintained. During the period, the secondary system of control, illustrated by the thermo-hydraulic system at 29, maintains its control pressures in conduit 28 and bellows 25, driving stem member 26 downward through its hole in lever member 20 until the limiting shoulder or protuberance on said stem engages upon member 20, limiting the expansion of bellows 25 and preventing engagement of stem member 27 with stem member 26.

Upon failure of the common source of air power supply to the primary system of control, the decay of the pressure of the air supply, transmitted by conduit 14 to a monitor device including housing 15, allows the force of spring 17 to drive piston 16 to the bottom limit of its housing 15. This downward movement of piston 16 causes stem 19 to rotate lever 20 counterclockwise about point 21 until engagement between stem 26 and 27 becomes operative, and the rotation continues the degree sufficient to disengage the shoulder of stem 26 from its contact with lever member 20 in order that the secondary system control pressures in conduit 28 will be transmitted by way of bellows 25 and stem 26, their values positioning stem 27 of feed water control valve 1 in opposition to the standard spring member of the valve which tends to move stem 27 in an upward direction. Specific sizing of bellows 25, housing 24, stem 26, stem 19, spring 17 and piston 16 have been deliberately avoided as falling within the realm of design considerations, the force needed for positioning valve stem 27, and the movement needed for complete disengagement of stems 26 and 27 during normal function of the air supply.

Handjacks are commonly utilized to override any automatic control effect on control valves during periods when manual positioning is desirable or required. Handjacks may assume the form illustrated in Fig. 2 wherein the control hand wheel is designated 34. Rotation of 34 raises or lowers the attached stem 27A by reason of thread engagement with diaphragm housing 35. The vertical movement is transmitted across diaphragm 36 to plate 37, resting upon spring cage 38 retaining a conventional valve spring 39 which tends to move cage 38 upward by reason of the force of compression and therefore attached valve stem 27A. Valve stem 27A extends from engagement with the handjack and diaphragm 36 down into body 40 of the control valve 1A to position the valve discs 41 in desired relation to the seats of valve cage 42 for regulation of the flow rate of fluid through the body 40. Continuous control of valve stem 27A of Fig. 2, or 27 of Fig. 1, is the specific object of our invention, and the two embodiments of these figures illustrate its flexibility in event of the desirability to include auxiliary equipment, as the handjack, to the diaphragm housing which might interfere with the operation.

Figure 2:
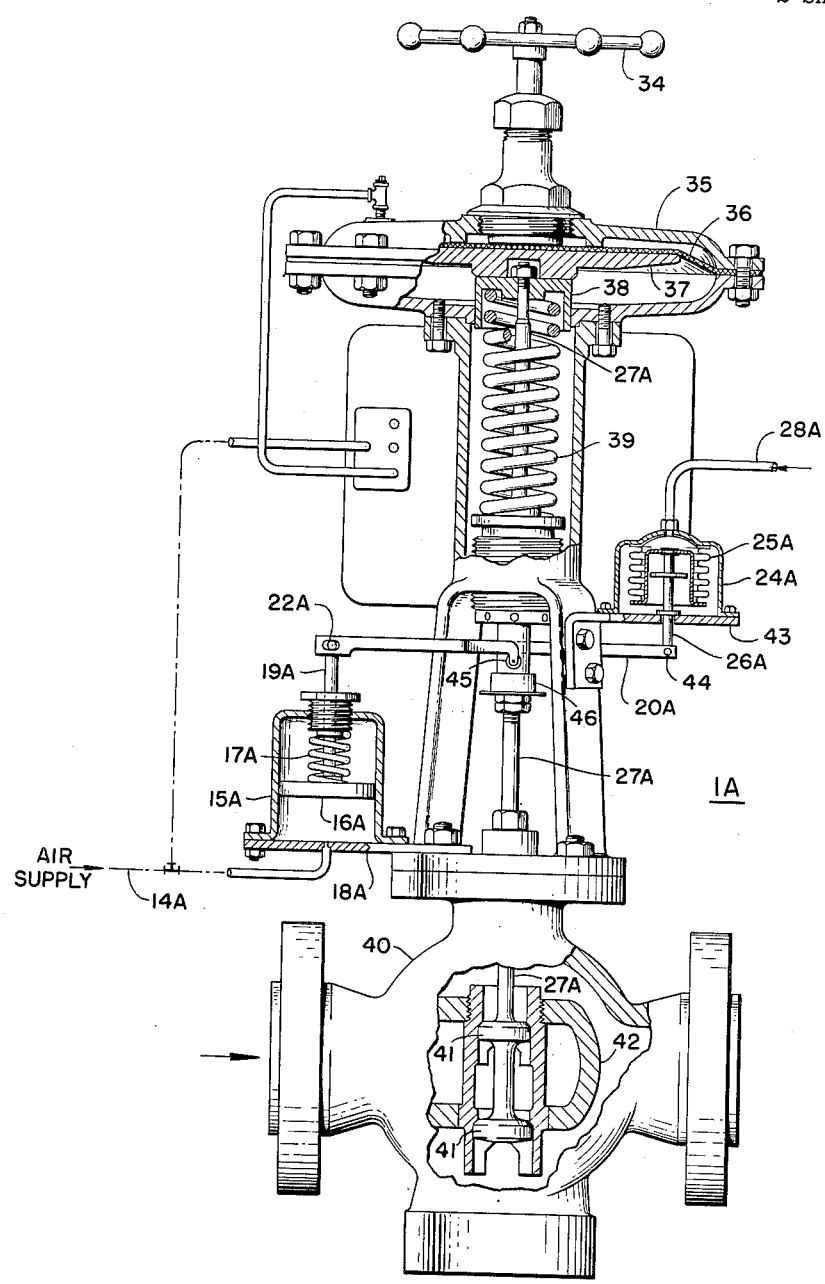
Fig. 2 is an embodiment of our invention illustrating its mounting on a standard valve housing in such manner as to permit inclusion of a hand-jack for manual positioning.

Take initial note, in connection with examination of Fig. 2, of members given an "A" following, for their function is considered so nearly analogous to those complementary members designated in Fig. 1 without an "A" following as to render such technique advantageous in correlating the similar operation of the embodiments.

In the embodiment of Fig. 2, bellows housing 24A is supported by a bracket 43 from the frame of control valve 1A in a position from which its stem 26A can extend through said bracket and attach to lever member 20A through a pivot at 44. Lever member 20A carries a roller 45 to operatively engage valve stem 27A by bearing upon collar 46 attached to 27A.

Thus it can be easily analyzed, that during normal operation, the common air supply pressure drives piston 16A upward to compress spring 17A and rotate lever 20A clockwise about pivot 44 until disengagement of members 45 and 46 is complete. Secondary control pressure in conduit 28A expands bellows 25A within housing 24A until a shoulder of stem 26A positively engages plate member 43, giving a fixity of position to pivot 44 when lever member 20A rotates thereabout during disengagement.

Upon failure of the common air supply, the decay of its pressure in conduit 14A allows spring 17A to drive piston 16A downward and rotate lever member 20A about pivot 44 by means of attached piston stem 19A through a slot at 22A. During this counterclockwise rotation, operative engagement between roller 45 and collar 46 occurs, and the rotation continues the degree sufficient to raise the limiting shoulder on bellows stem 26A from its engagement with bracket member 43 that the secondary control effect may be given transmission to valve stem 27A through subsequent rotation of lever member 20A about position 22A.

Provision is made to minimize shock on the apparatus, and the secondary system of control it applies, through a restriction in the conduit of common air supply line 14A entering housings 15 and 15A of Figs. 1 and 2 respectively. With the restriction, or orifice, properly sized, the decaying of the pressure of the common air supply is limited to a maximum rate and the apparatus of the invention is brought into operation slowly enough to allow the secondary system of control to make the minor self-adjustments it might require to smoothly assume control of the valve 1.

Referring now to Fig. 3, there is shown a modification of the Fig. 1 embodiment of our invention which is feasible if broader limits of liquid level in drum 5 are permissible.

It may easily be the case that the limits of the level to which the vaporizable liquid within generator 5 must be held may vary beyond those maintained by the primary system of control. If that variation is permissive, the secondary system of control may be calibrated to hold the liquid level lower than the level held by the primary control system and reduction of level due to failure of the primary system and the closing of valve 1 under influence of its spring will be checked by the assumption of control by the secondary system at the lower level.

It is obvious that primary control system failure must always allow the valve spring of 1 to close the valve ports so that the level will sink in drum 5. And it is further obvious that the secondary control system must be set at a level enough below normal that it will produce no control effect during that normal period which will interfere with the positioning of valve stem 27 by the primary control system.

The specific apparatus to perform the above function desired is disclosed by Fig. 3. Conduit 28, bellows 25, housing 24 and stem 26 cooperate in the same manner as in the Fig. 1 embodiment. However, housing 24 is firmly attached to plate 26B which holds stem 26 in vertical alignment with valve stem 27 by virtue of its rigid attachment to the housing of valve 1 by means of brackets 23 and 59. All that remains is to calibrate both primary and secondary control systems that normal positions taken by stem 27 under influence of the primary control system will not cause stem 26 to transmit control pressures from the secondary control system thereto of a magnitude that the normal operation will be biased undesirably. Then failure in the primary system will cause valve stem 27 to rise under valve spring pressure until stem 26 is transmitting control pressures of the secondary system as it senses the sinking level of the liquid within drum 5.

If this standard of operation is satisfactory for a particular system, the Fig. 3 embodiment of our invention will obviously eliminate many moving parts of the prior embodiments with consequent reduction in wear of parts and complexity of design.

We have illustrated one form that our invention may assume in practice with an air supplied, primary system of feed water control, and a hydraulic operated secondary system of feed water control, but we desire in no wise to be limited thereto. Our invention is conceivably adapted to many forms of primary and secondary control systems functioning with various mediums of power.

What we claim as new and desire to secure by Letters Patent of the United States, is:

1. A control system for regulating the supply of an agent to vary or maintain a condition, including in combination, means responsive to a first operating variable of the condition, a primary source of fluid pressure to said means, said primary fluid pressure varied in accordance with said operating variable by said responsive means, a first control means sensitive to the variation of the primary fluid pressure, regulating means for controlling the supply of an agent, said first control means operable to control said regulating means, said first control means operative only in accordance with the variation of the primary fluid pressure, means responsive to a second operating variable of the condition, a secondary source of fluid pressure associated with said last-named means, said secondary fluid pressure varied in accordance with said second operating variable by said means responsive to said second operating variable, a second control means sensitive to the variations of the secondary fluid pressure, and means operative upon failure of the primary source of fluid pressure to actuate said regulating means through the second control means only.

2. A control system for regulating the supply of an agent to a condition, including in combination, means adjustable to regulate the rate of the agent supply, a primary source of fluid pressure to be varied, a first control means sensitive only to the variation of said fluid pressure, means responsive to a first operating variable of the condition to vary said primary fluid pressure, said first control means operable to position the adjustable means regulating the agent supply, a secondary source of fluid pressure to be varied, a second control means sensitive to the variation of the secondary fluid pressure, a second means responsive to a second operating variable of the condition to vary said secondary fluid pressure, and means operative upon the failure of the primary source of fluid pressure to actuate the adjustable means for controlling the supply of the agent through the second control means only.

3. In combination, a multi-element control system actuated in accordance with an operating condition of a steam generator, a source of air pressure for said system, a first air loading pressure established by said multi-element system, a fluid pressure relay responsive to said first air loading pressure, a valve means controlling the supply of feed water to the steam generator positioned in accordance with the first air loading pressure, a thermo-hydraulic generator control system including a bellows responsive to the fluid pressure of the thermohydraulic generator control system, a housing for said bellows rigidly attached to the feedwater valve, and means for transmitting the bellows movement to the stem of said feedwater valve only during periods of air pressure failure in the multi-element control system.

4. The combination of claim 2 in which the means operative upon the failure of the primary source of fluid pressure to actuate the adjustable means for controlling the supply of the agent through the second control means only includes a monitor device responsive to the primary source of fluid pressure, means for continuously imposing the effects of variations of the secondary fluid pressure on said monitor device, means for maintaining said monitor device in predetermined relationship of position to the adjustable means regulating the agent supply, and means for causing said monitor device to assume another relative position in relation to said adjustable means regulating the agent supply upon decay of said primary source of fluid pressure.

5. The combination of claim 2 in which the means operative upon the failure of the primary source of fluid pressure to actuate the adjustable means for controlling the supply of the agent through the second control means only includes an expansible chamber with a movable wall, means for continuously applying the secondary source of fluid pressure to said expansible chamber, a piston member, means for continuously applying the primary source of fluid pressure to said piston member, means controlled by said piston member for maintaining said expansible chamber in non-operable relation to the adjustable means regulating the agent supply during application of the primary source of fluid pressure to said piston member, and means for maintaining said expansible chamber in operable relation to said adjustable means regulating the agent supply during decay of pressure in said primary source of fluid pressure.

6. The combination of claim 2 in which the means operative upon the failure of the primary source of fluid pressure to actuate the adjustable means for controlling the supply of the agent through the second control means only includes a casing continuously receiving fluid pressure from the secondary source of fluid pressure, a bellows within said casing upon which said last-mentioned fluid pressure is effective, a lever member positioning said casing, said adjustable means including a valve means having an operating stem, means for maintaining a fixed relation between said lever member and said valve means, and means for pivoting said lever member in direction and extent necessary to bring said bellows into operating engagement with the operating stem of said valve means upon failure of the primary source of fluid pressure.

7. The combination of claim 6 in which the means for pivoting the lever member comprises a conduit from said primary source of fluid pressure, a casing connected with said conduit, a piston operable within said casing by fluid pressure from said conduit, a coil spring on the side of said piston opposite that acted on by the fluid pressure, a plate member sealing the end of said chamber on the spring side of said piston, and a piston stem member extending through the coil of said spring and through said plate member and connected with said lever member.

8. The combination of claim 2 in which said adjustable means includes a valve member having an operating stem and in which the means operative upon the failure of the primary source of fluid pressure to actuate the adjustable means for controlling the supply of the agent through the second control means only includes a first expansible chamber secured to the valve means and receiving fluid pressure from said secondary source of fluid pressure, a second expansible chamber secured to the valve means and receiving fluid pressure from said primary source of fluid pressure, a beam positionable from each end by the expansible chambers, and a fulcrum means attached to the beam adapted to bear upon the operating stem of the valve means upon failure of said primary source of fluid pressure so that the operating stem will be positioned by said secondary source of fluid pressure through the first expansible chamber positioning the beam.

9. The combination of claim 2 in which the means operative upon the failure of the primary source of fluid pressure to actuate the adjustable means for controlling the supply of the agent through the second control means only includes a control applicator having a stem member responsive to said secondary source of fluid pressure, said adjustable means including a valve means having an operating stem, lever means positioning said stem member in relation to the valve means, means of securing said lever to said valve means at a pivotal point, and means for rotating said lever about said point in a direction determined by the absence or presence of pressure from said primary source of fluid pressure to operatively engage or non-operatively disengage the operating stem of said valve means with said stem member.

10. The combination of claim 2 in which the means operative upon failure of the primary source of fluid pressure to actuate the adjustable means for controlling the supply of the agent through the second control means only includes a monitor device responsive to the secondary source of fluid pressure, and means for maintaining the monitor device in a position from which it can apply the effect of variations in the secondary source of fluid pressure to said adjustable means regulating the agent supply upon failure of the primary source of fluid pressure.

FRANK H. FELLOWS.
HARVARD H. GORRIE.

References Cited in the file of this patent

UNITED STATES PATENTS

| Number | Name | Date |
| --- | --- | --- |
| 2,006,035 | Stewart | June 25, 1935 |